United States Patent [19]
Waites

[11] Patent Number: 5,664,092
[45] Date of Patent: Sep. 2, 1997

[54] SYSTEM AND METHOD FOR PERFORMING LOCKED TEST AND SET OPERATIONS IN AN INSTRUMENTATION SYSTEM

[75] Inventor: Nigel Waites, El Paso, Colo.

[73] Assignee: National Instruments Corporation, Austin, Tex.

[21] Appl. No.: 531,291

[22] Filed: Sep. 20, 1995

[51] Int. Cl.$^6$ .................................................. G06F 11/00
[52] U.S. Cl. ........................................ 395/183.01; 395/288
[58] Field of Search ............................. 395/183.01, 180, 395/288, 293, 490, 472, 479, 483, 729

[56] References Cited

U.S. PATENT DOCUMENTS

| | | | |
|---|---|---|---|
| 4,484,273 | 11/1984 | Stiffler et al. | 364/200 |
| 5,050,072 | 9/1991 | Earnshaw et al. | 364/200 |
| 5,115,499 | 5/1992 | Stiffler et al. | 395/425 |
| 5,261,108 | 11/1993 | Hayashi et al. | 395/725 |
| 5,276,847 | 1/1994 | Kohn | 395/425 |
| 5,283,870 | 2/1994 | Joyce et al. | 395/800 |
| 5,428,761 | 6/1995 | Herlihy et al. | 395/425 |

*Primary Examiner*—Robert W. Beausoliel, Jr.
*Assistant Examiner*—Joseph E. Palys
*Attorney, Agent, or Firm*—Conley, Rose & Tayon; Jeffrey C. Hood

[57] ABSTRACT

A system and method for performing locked test and set cycles in a system having a plurality of interconnected buses, wherein one or more of the buses do not support locked test and set cycles. A CPU executing one or more processes is connected to one or more first buses that do not support locked test and set cycles. These one or more first buses are connected through a test and set device according to the present invention to one or more second buses which support locked test and set cycles. A memory is coupled to one of the one or more second buses that includes a semaphore bit shared by multiple threads or processes executing on the CPU. The test and set device performs locked test and set operations on the semaphore bit(s) in the memory at the direction of the thread executing on the CPU. A process or thread begins a test and set operation by setting a bit in a register in the test and set device then performing a read to the test and set device that maps to the target memory where the respective semaphore bit is located. In response to the read, the test and set device performs a locked read/write operation to the target memory using an atomic read/write protocol which locks out accesses from other processes. The test and set device then returns the read data obtained from the target memory semaphore bit to the CPU. The read cycle on the first bus is maintained until the test and set device has completed the test and set operations to the respective semaphore bit in the memory. In this manner, the one or more first buses are locked during the test and set operation, even where the one or more first buses do not inherently support test and set operations.

22 Claims, 5 Drawing Sheets

SYSTEM AND METHOD FOR PERFORMING LOCKED TEST AND SET OPERATIONS IN AN INSTRUMENTATION SYSTEM

FIELD OF THE INVENTION

The present invention relates to computer systems having a plurality of interconnected buses, and more particularly to a method for performing locked test and set cycles in a system that includes one or more buses which do not support locked cycles.

DESCRIPTION OF THE RELATED ART

Many times in computer systems it is desirable to perform a test and set operation on one or more bits in memory. For example, if one or more bits in memory are being used as a semaphore to indicate ownership of an address space or a block of memory, processes or threads executing on the CPU will generally desire to test the value of the bit to determine if another thread has ownership of the address space. If the bit indicates that the memory is not owned by another process or thread, then the respective process or thread will set the bit to indicate that it has acquired ownership of the memory or address space.

During a test and set operation it is critical that the read and write operation be performed in one locked cycle without other processes or threads having access to the bit between the read and the write. If another process or thread had access to the semaphore bit during a test and set operation by a first thread, then invalid operations may occur. For example, if one process has read the value of the semaphore bit and has determined that the respective address space is not owned by any process or thread, and before that thread can write an updated value to indicate that it has acquired ownership of the address space another thread were to read the bit and determine that no thread has ownership of the respective address space, then both threads may conclude that each respectively owns the address space. The result would be two processes or threads behaving as if each actually owned the address space, resulting in possible erroneous operation.

In order to prevent erroneous operation, a test and set operation is generally required to be performed in locked cycles without any intervening cycles from other threads. Thus, the test or read operation is performed and the set or write operation is performed immediately after the read without any intervening cycles from other processes or threads. This prevents another process or thread from reading the value of the semaphore after a first process or thread has read it, but before the first process has had a chance to set the bit to indicate ownership.

Modern computer-controlled instrumentation systems typically include a plurality of interconnected buses of different types. A problem arises when a thread executing on a device desires to perform a test and set operation on one or more bits in memory wherein the device and the memory are separated by one or more interconnected buses that do not support locked test and set cycles. For example, if a process or thread executing on a CPU desires to perform a test and set operation on a memory that is separated from the CPU by one or more connected buses, and at least one of the one or more connected buses does not support locked test and set cycles, then there is no way to implement the locked test and set cycle on that respective bus. Correspondingly, there is no way to guarantee that the test and set cycle remains locked. Therefore, a locked test and set cycle has not been possible in these systems. However, as discussed above, it is necessary to lock out other cycles during test and set operations to prevent possible erroneous operation. Therefore, a system and method is greatly desired which allows implementation of test and set cycles in systems having a plurality of interconnected buses, wherein one or more of the interconnected buses does not support locked test and set cycles.

SUMMARY OF THE INVENTION

The present invention comprises a system and method for performing locked test and set cycles in a system having a plurality of interconnected buses, wherein one or more of the buses do not support locked test and set cycles. In the preferred embodiment of the invention, a CPU executing one or more processes is connected to one or more first buses that do not support locked test and set cycles. These one or more first buses are connected through bus interface bridge logic according to the present invention to one or more second buses which support locked test and set cycles. A memory is coupled to one of the one or more second buses that includes a semaphore bit indicating ownership of a memory or address space shared by multiple threads or processes executing on the CPU. The bus interface bridge logic includes test and set logic according to the present invention, which performs locked test and set operations on the semaphore bit(s) in the memory at the direction of threads executing on the CPU. The bus interface device also includes predetermined set data that is used during the set portion of the locked test and set cycle. This predetermined set data is programmable and can be changed depending on the CPU architecture.

In the preferred embodiment of the invention, a process or thread executing on the CPU begins a test and set operation by setting a test and set prearm bit in a register in the bus interface bridge logic indicating that a locked test and set operation is desired. The process then performs a read to the bus interface bridge device that maps to the target memory where the respective semaphore bit is located on which the test and set is desired. In response to the read, the test and set logic performs a locked read/write operation to the target memory using an atomic read/write protocol which locks out accesses from other processes. As part of the read/write operation, the bus interface bridge logic writes the predetermined set data to the semaphore bit in the target memory indicating ownership.

After completion of the locked read/write operation, the bus interface bridge returns the read data obtained from the target memory semaphore bit to the CPU and acknowledges completion of the read cycle. Thus the read cycle on the first bus is maintained until the test and set logic in the bus interface bridge has completed the test and set operations to the respective semaphore bit in the memory. In this manner, the one or more first buses are effectively locked during the test and set operation, even where the one or more first buses do not inherently support locked test and set operations. The process then uses the returned data value to determine if another process has ownership of the semaphore bit. If the return data indicates that another process or thread already has ownership of the semaphore bit, then the respective process or thread preferably implements the above steps again at a later time. If the return data indicates that no other process or thread had ownership prior to the test and set operation, then the process knows that it now has ownership of the respective memory space, and it performs the desired operations. Once the desired operations have completed, the process or thread later clears the semaphore bit by writing a respective zero value to the target memory.

Therefore, the present invention comprises a system and method for performing locked test and set operations in a system having a plurality of interconnected buses wherein one or more of the buses do not support locked test and set operations.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
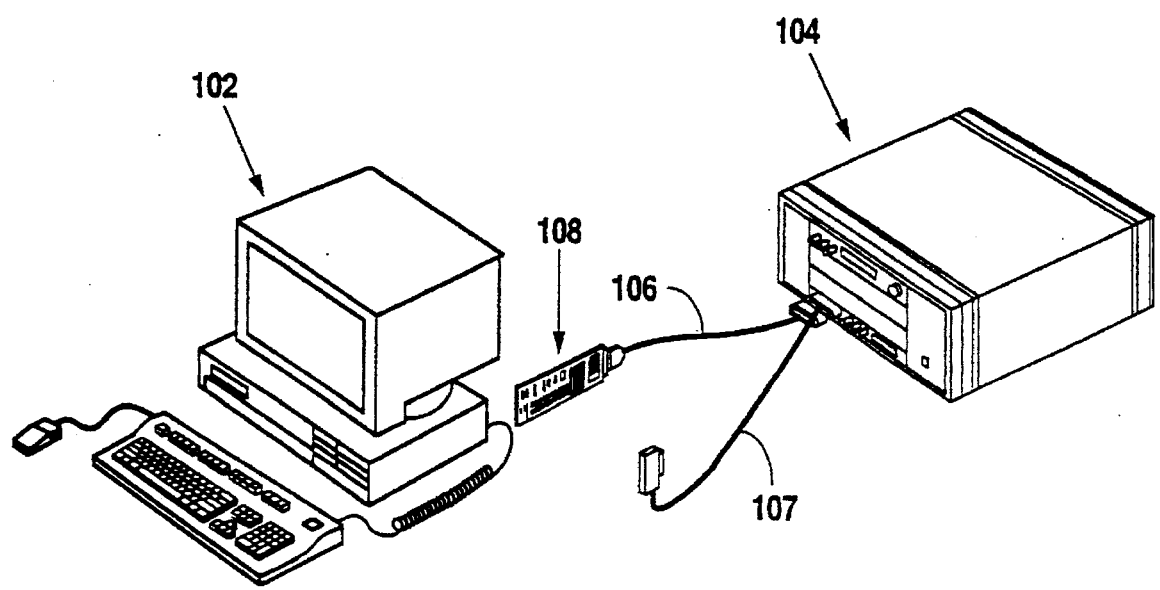
FIG. 1 illustrates an instrumentation system controlled by an external computer.

Referring now to FIG. 1, an instrumentation system incorporating the system and method of the present invention is shown. As previously discussed, the present invention is preferably incorporated into an instrumentation system. However, it is noted that the present invention may be incorporated into other systems as desired. The instrumentation system shown in FIG. 1 includes an external computer 102 preferably comprising a system unit, monitor, keyboard, and mouse, as shown. In the embodiment shown in FIG. 1, the external computer 102 includes an expansion bus, preferably based on the industry standard architecture (ISA), also referred to as the AT bus. It is noted that other expansion buses may be used as desired. The external computer 102 includes an interface card referred to as the AT-MXI interface card 108 (shown outside of the external computer for illustrative purposes) which interfaces between the expansion bus in the external computer 102 and a MXI bus implemented on MXI cable 106. The AT-MXI interface card 108 translates between AT bus signals in the external computer 102 and MXI bus signals in the MXI cable 106. The external computer 102 is coupled to a VXI mainframe 104 through the MXI cable 106.

The VXI mainframe 104 includes a first VXI-MXI extender card (230 FIG. 3) which receives MXI signals from the MXI cable 106 and translates these signals into VXI signals which are supplied to the VXI backplane or bus built into the VXI mainframe 104. A plurality of VXI instruments are preferably comprised within the VXI mainframe 104 connected to the VXI backplane. Therefore, the external computer 102 controls VXI instruments in the VXI mainframe 104 by generating signals across the expansion bus through the AT-MXI interface 108, the MXI cable 106, and to the VXI-MXI extender inside the VXI mainframe 104. The VXI-MXI extender converts the respective signals into VXI signals, which are then used to control the VXI instruments. The VXI mainframe 104 may also include a second VXI-MXI extender (230A FIG. 3) which connects to a second MXI cable 107 that is used for connecting to other VXI mainframes as shown. In this manner, a plurality of VXI mainframes 104 can be daisy-chained together to allow the external computer 102 to control a greater number of VXI instruments.

Figure 2:
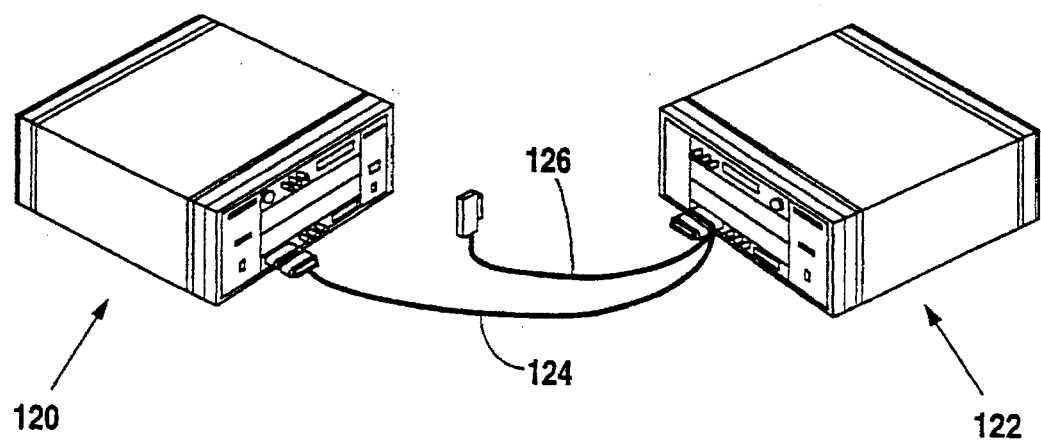
FIG. 2 illustrates an instrumentation system comprising two VXI mainframes controlled by an embedded CPU.

Referring now to FIG. 2, an alternate embodiment which implements the system and method of the present invention is shown. In the system shown in FIG. 2, an external computer is not used to control the instrumentation system, but rather a first VXI mainframe 120 includes an embedded CPU resource manager which controls VXI instruments in the first VXI mainframe 120 and also controls VXI instruments in a second VXI mainframe 122. The first VXI mainframe 120 includes a VXI-MXI extender (not shown) which translates VXI signals into MXI signals that are transferred over MXI cable 124 to the second VXI mainframe 122. The second VXI mainframe 122 includes a VXI-MXI extender (not shown) which translates the MXI signals into VXI signals that are provided over the VXI backplane to control the respective VXI instruments in the second VXI mainframe 122. In this manner, the embedded CPU resource manager inside the first VXI mainframe 120 controls VXI instruments in both the first and second VXI mainframes 120 and 122. Also, the second VXI mainframe 122 may include a second VXI-MXI extender (not shown) which connects to an additional MXI cable 126 that can connect to a third VXI mainframe (not shown) as desired. In this manner, any number of VXI mainframes can be daisy-chained together to allow the embedded CPU resource manager in the first VXI mainframe 120 to control any number of VXI instruments.

Figure 3:
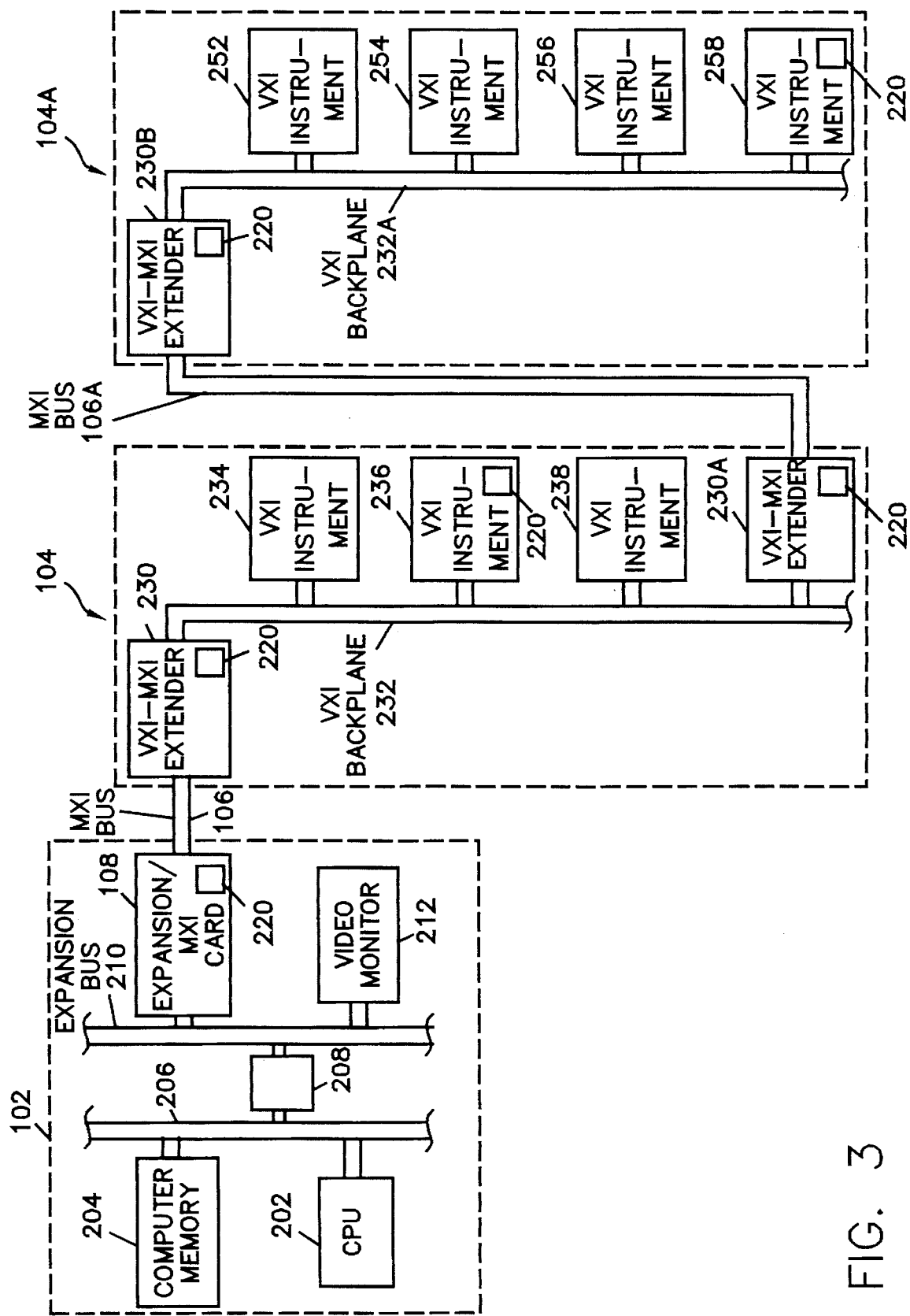
FIG. 3 is a block diagram of the instrumentation system of FIG. 1.

Referring now to FIG. 3, a block diagram illustrating the components comprising the instrumentation system in FIG. 1 is shown. As shown, the external computer 102 includes a CPU 202 and computer memory 204 connected to a system bus 206. The system bus 206 is connected through a bus interface 208 to an expansion bus 210. The expansion bus 210 can be based on any of the various types of bus standards, including the industry standard architecture (ISA), referred to as the AT bus, the extended industry standard architecture (EISA), microchannel architecture (MCA), and the NuBus, as well as others. In addition, the expansion bus can be a local bus such as the Peripheral Component Interconnect (PCI) bus or the VL bus. A video monitor 212 is coupled to the expansion bus 210. The expansion/MXI card 108 is preferably coupled to the expansion bus 210. As discussed above with regard to FIG. 1, the expansion bus used in the embodiment in FIG. 1 is the AT bus, and the expansion/MXI card is the AT-MXI interface card 108. The expansion bus 210 preferably does not support locked cycles or test and set cycles. As is well known, the AT bus does not support locked cycles or test and set cycles. As shown, the expansion/MXI interface card 108 includes test and set logic 220 according to the present invention which implements test and set operations as directed by processes or threads executing on the CPU 202.

The expansion/MXI card 108 couples through the MXI bus over a MXI cable 106 to a VXI-MXI extender 230. The VXI-MXI extender 230 is coupled to a VXI backplane 232. A plurality of VXI instruments 234, 236, and 238 are preferably coupled to the VXI backplane as shown. The VXI-MXI extender 230 translates MXI signals received from the MXI bus 106 into VXI signals that are provided over the VXI backplane 232 and vice-versa. The VXI-MXI extender 230 preferably includes test and set logic 220 according to the present invention, which is similar to the test and set logic 220 in the expansion/MXI card 108. One or more of these VXI instruments, such as the VXI instrument 236, may also include test and set logic according to the present invention. In one embodiment of the invention, the VXI mainframe 104 includes a second VXI-MXI extender 230A which couples through a second MXI cable 106A to a second VXI mainframe 104A. The second VXI mainframe 104A includes a third VXI-MXI extender 230B which connects to the MXI bus 106A. The VXI-MXI extender 230B connects to a VXI backplane 232A. A plurality of VXI instruments 252, 254, 256, and 258 are connected to the VXI backplane 232A.

The third VXI-MXI extender 230B preferably includes test and set logic 220 according to the present invention. One or more of the VXI instruments 252–258, such as the instrument 258 may also include test and set logic according to the present invention. It is noted that further VXI mainframes can be daisy-chained in this fashion, as desired. One or more of the VXI instruments 234, 236, 238, 252, 254, 256, and 258 include local memory 270 which stores a semaphore bit indicating control of an address space. As discussed further below, when a process or thread executing on the CPU 202 desires to perform a test and set operation on a semaphore bit in a memory situated in one of the VXI mainframes 104 or 104A, the process or thread first sets a test and set prearm bit in a target device including test and set logic 220 of the present invention. The process or thread then initiates a read to the respective test and set logic 220 that maps to the target memory where the semaphore bit is located. The test and set logic 220 receives the read and in response performs the test and set operation. When the test and set operation has completed, the test and set logic 220 returns the read data to the CPU 202. Since the read operation is pending during the test and set operation, the bus 210 is effectively locked.

Figure 4:
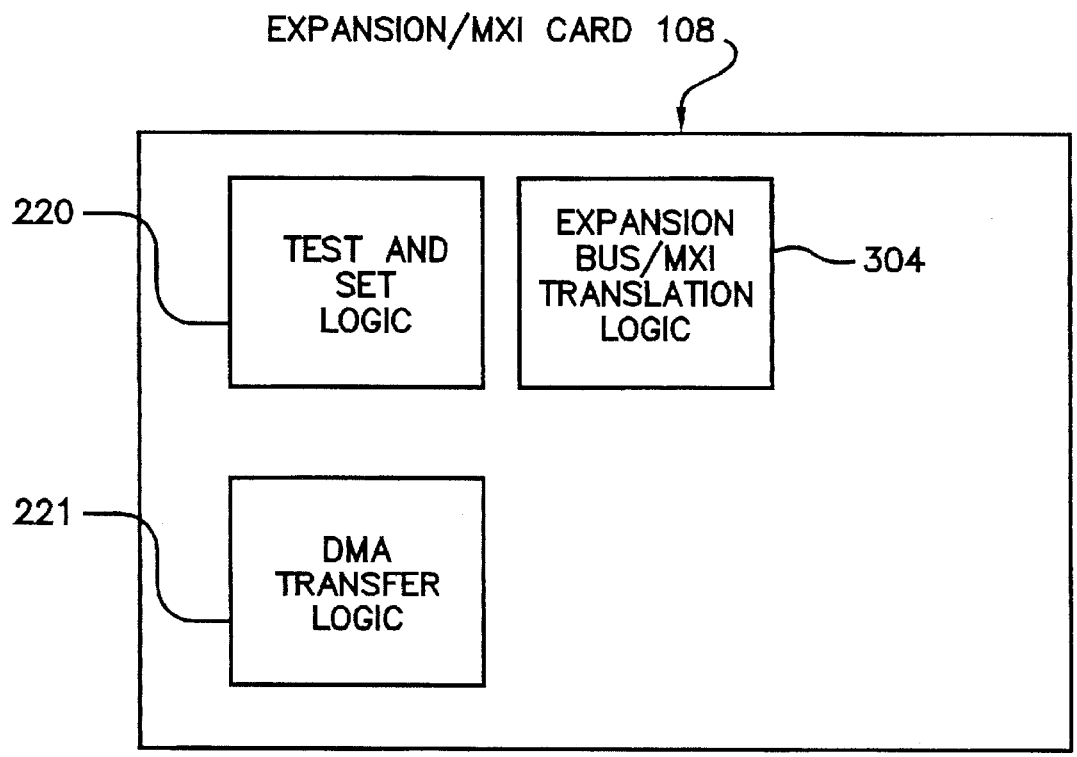
FIG. 4 is a block diagram of the expansion/MXI card in the block diagram of FIG. 3.
Figure 5:
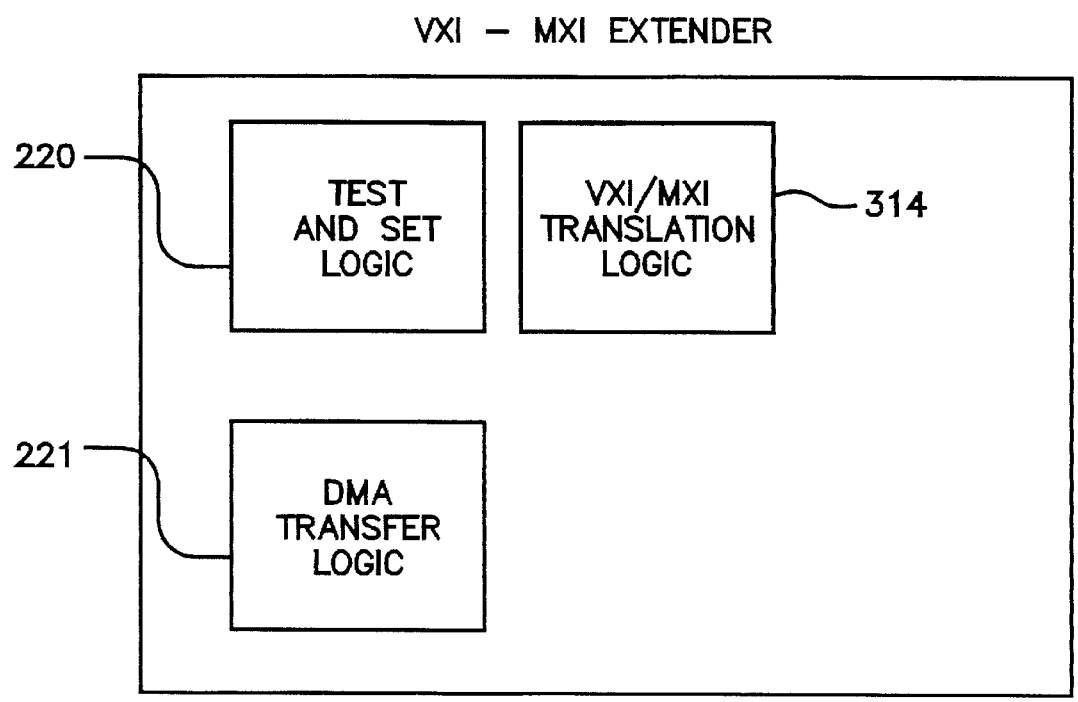
FIG. 5 is a block diagram of the VXI-MXI extender in the block diagram of FIG. 3.

Referring now to FIG. 4, a block diagram illustrating elements comprised in the expansion/MXI card 108 is shown. As shown, the expansion/MXI card 108 includes the test and set logic 220, DMA transfer logic 221 and expansion/MXI translation logic 304. As discussed above, the test and set logic 220 performs test and set operations according to the present invention. The DMA transfer logic 221 performs data transfers and the expansion/MXI translation logic 304 converts signals between the expansion bus 210 and the MXI bus 106. Referring now to FIG. 5, a block diagram illustrating the components in each of the VXI-MXI extenders 230, 230A, and 230B are shown. In the preferred embodiment, the VXI-MXI extenders 230, 230A, and 230B are identical. As shown, each VXI-MXI extender includes test and set logic 220, DMA transfer logic 221, and VXI-MXI translation logic 314. As discussed above, the test and set logic 220 performs test and set operations according to the present invention, the DMA transfer logic 221 performs data transfers, and the VXI/MXI translation logic 314 performs translations between VXI and MXI signals.

Referring again to FIGS. 1 and 3, in the preferred embodiment, test and set logic 220 according to the present invention is included on the AT-MXI interface card 108, one or more of the VXI-MXI extenders 230, 230A, and 230B in the VXI mainframes 104 and 104A, and one or more of the VXI instruments such as instruments 236 and 258. This logic performs test and set operations at the direction of a process or thread executing on the CPU 202. According to the prior art, if the CPU 202 desired to perform a test and set operation on memory located in one of the VXI mainframes 104 or 104A, such as the VXI instrument 234, the CPU 202 would be unable to guarantee a locked test and set operation because the AT expansion bus 210 does not support locked cycles. Therefore, the CPU 202 would be unable to guarantee that the set or write operation occurred immediately after the test or read operation without any intervening cycles from other processes or threads. As described in the background section, if another process or thread began a test and set cycle between the first thread's test and set operations, then, both processes or threads may erroneously determine that each has control of the respective address space, resulting in possible erroneous operation. Therefore, heretofore, there has been no method to perform test and set operations in a system having a plurality of interconnected buses, wherein one or more of the buses does not support locked cycles.

As discussed above, one or more of the devices in the VXI mainframes 104 and 104A include local memory storing a semaphore bit which indicates ownership of a predetermined address space. It is noted that the semaphore bit may comprise one or more bits depending upon the CPU architecture being used. For example, some architectures utilize a single bit semaphore wherein the bit is zero to indicate no process or thread has acquired ownership of the address space and is set to one to indicate that a process or thread has acquired ownership. Other architectures utilize a two-state bit field. For example, the bit field is all zeros when no ownership exists and is all ones when a process or thread has acquired ownership of the address space. In the preferred embodiment of the invention, each test and set logic 220 includes a 32-bit register that is configured with a respective pattern of "set data" that is written to the semaphore to indicate that a thread owns the resource. In the preferred embodiment, this 32-bit register is configured upon power-up with the proper set data depending upon the CPU architecture being used. For example, the Motorola 68000 family of microprocessors uses a single semaphore bit that is either zero or one. The Sun SparcStation uses the value 0FFh as semaphore values. Thus, the 32-bit register allows the user to configure any set value into the register depending upon the CPU architecture used.

Figure 6:
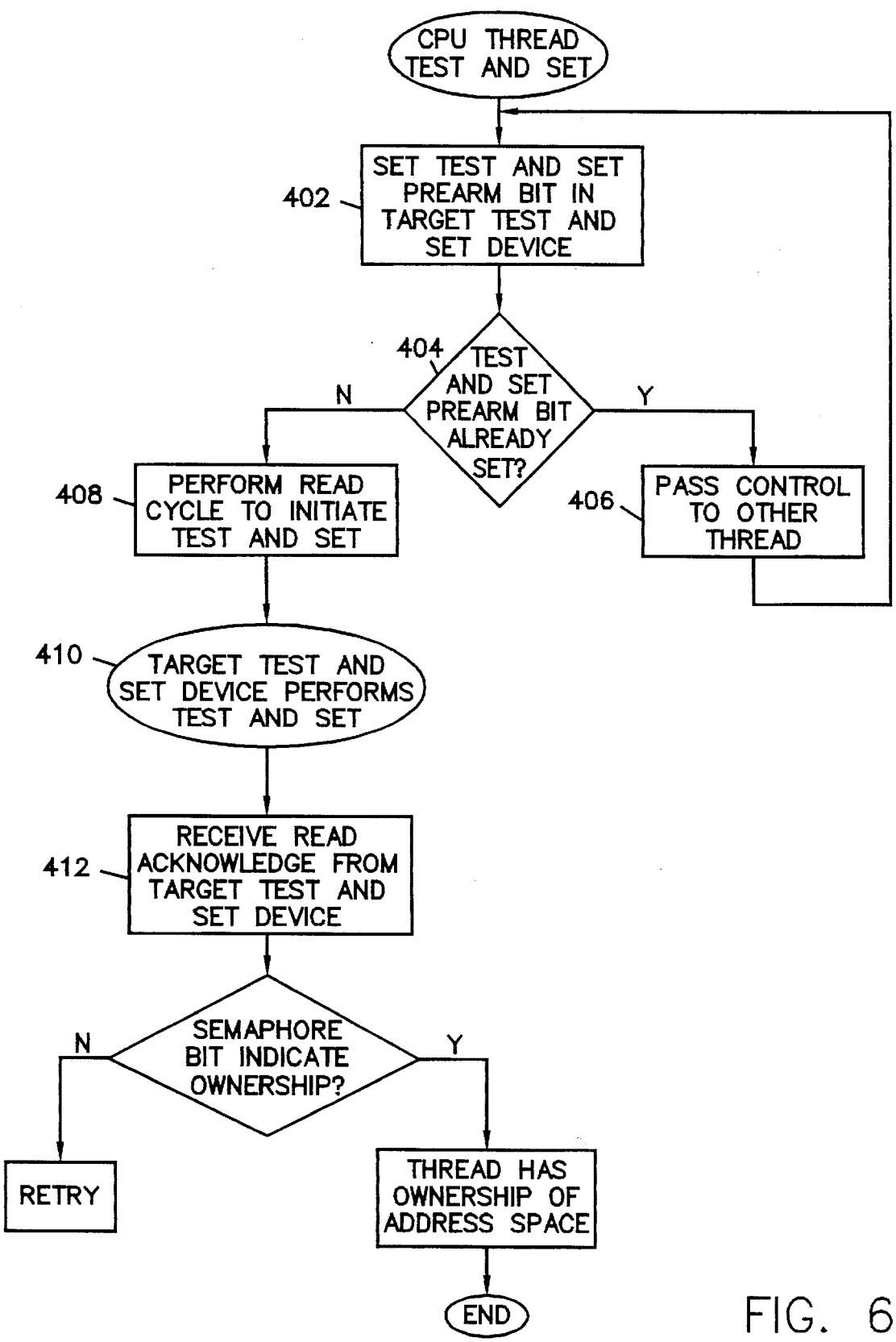
FIG. 6 is a flowchart diagram illustrating a request for a test and set operation according to the present invention by a thread executing on the CPU.

Referring now to FIG. 6, a flowchart diagram illustrating the operations performed by a process or thread executing on the CPU 202 that desires to perform a test and set operation on a semaphore bit in one of either of the VXI mainframes 104 or 104A is shown. This flowchart describes the operations performed by a thread executing on the CPU 202 to perform a test and set on a semaphore bit located in the local memory of a VXI instrument in the VXI mainframe 104, such as the VXI instrument 234. In step 402 the thread sets a test and set prearm bit in a target test and set logic 220 situated between the AT expansion bus 210 and the device where the semaphore bit is located, i.e., the VXI instrument 234. The thread sets the test and set prearm bit in the test and set logic 220 to provide an indication that a test and set operation is desired to be performed. It is required that the buses between the target test and set logic 220 and the device where the semaphore bit is located be capable of supporting locked test and set cycles. In the system of FIG. 3, the thread executing in the CPU 202 can set the test and set prearm bit in the expansion/MXI card 108 or in the VXI/MXI 230, as desired. As discussed above, the AT expansion bus 210 does not include locked read-modify-write or locked test and set cycle capabilities. Thus, a device situated after the AT expansion bus 210 must be requested to perform the test and set operation. In the preferred embodiment, the test and set logic 220 in the expansion/MXI card 108 is requested to perform the test and set operation. However, it is noted that the test and set logic 220 in the VXI/MXI extender 230 may be requested by the process or thread to perform the test and set operation as desired. The device requested by a thread to perform a test and set is referred to as the target test and set device.

After the thread has set the test and set prearm bit in the target test and set device in step 402, in step 404 the thread receives an indication from the target test and set device as to whether the test and set prearm bit was already set. If the test and set prearm bit was already set, then in step 406 the thread passes control to another thread so that this thread can complete its test and set operation. Thus, if a thread attempts to set the test and set prearm bit and this bit has already been set by another thread, the thread attempting to set the bit relinquishes control back to the thread that had already set the bit, so that this prior thread can perform its test and set operation.

If the test and set prearm bit was not already set in step 404, then the respective thread can continue with its test and set operation. It is noted that the CPU 102 preferably supports multiple threads as well as multiple windows of operation, wherein each thread operates in a separate window. Setting the prearm bit provides ownership of the test and set logic 220 for the thread in its respective window of operation. In step 408 the thread performs a read cycle to the target test and set device to initiate a test and set operation mapped to target memory where the respective semaphore bit is located. In step 410 the target test and set device performs the test and set operation. It is noted that step 410 is not a step executed by the CPU thread, but actually represents steps performed by the target test and set device, which are described below in FIG. 7.

Figure 7:
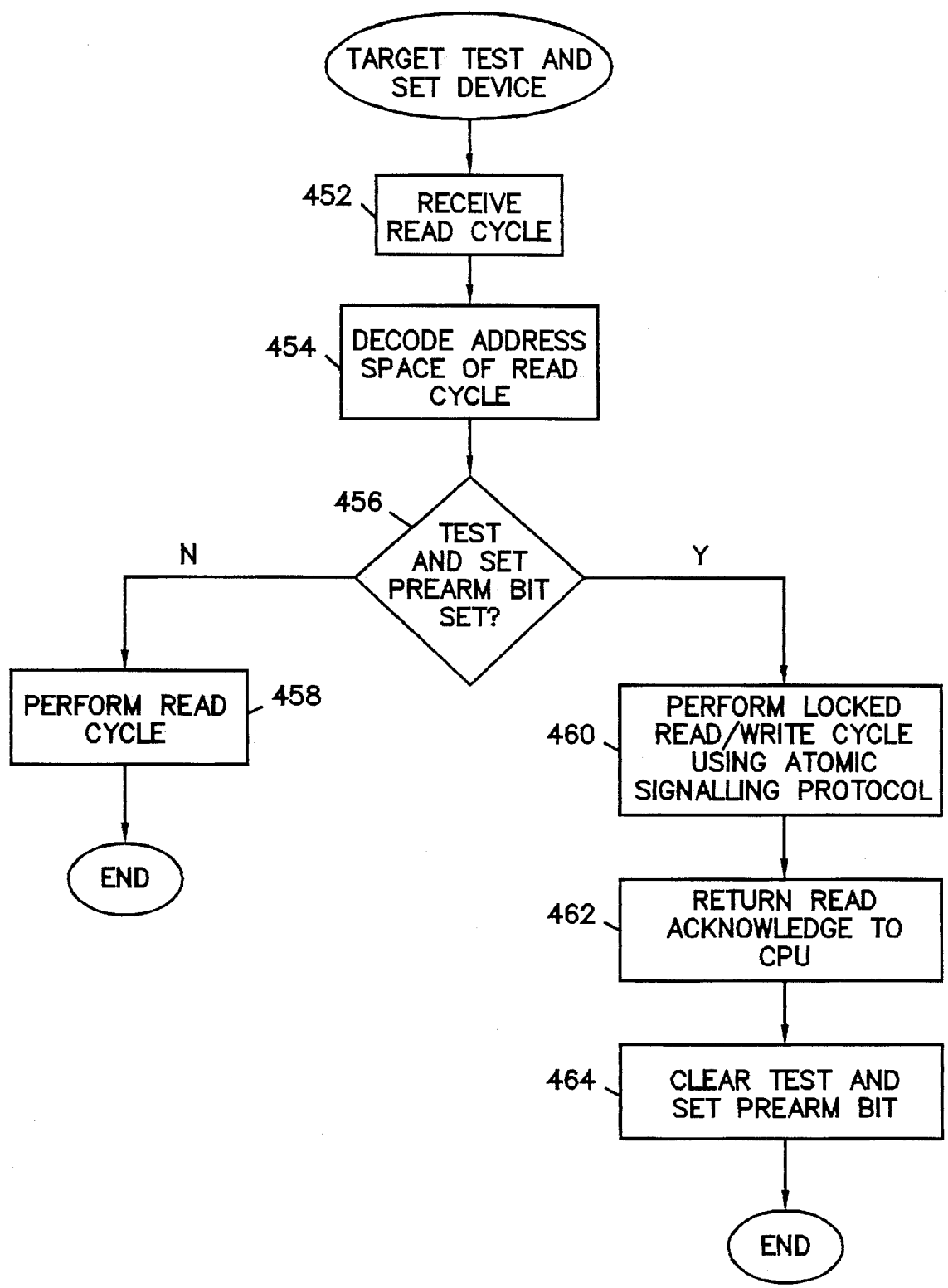
FIG. 7 is a flowchart diagram illustrating a test and set operation performed by a target test and set device according to the present invention.

Referring now to FIG. 7, step 410 of FIG. 6 is shown in greater detail whereby the target test and set device performs a test and set operation according to the present invention. In step 452 the target test and set logic 220 in the expansion/MXI card 108 receives the read cycle from the thread executing on the CPU 202. In step 454 the target test and set logic 220 decodes the address space of the read cycle and determines that the address space maps to a location where the semaphore bit is stored. In step 456 the target test and set logic 220 determines if the test and set prearm bit has been set. If not, then the device performs the read cycle in step 458 and returns the requested data to the thread executing on the CPU 202, as would normally be done. If the test and set prearm bit is determined to be set in step 456, then in step 460 the target test and set device, i.e., the expansion/MXI card 108 performs a locked read/write cycle using an atomic signalling protocol. If the read portion of the operation is successful, the semaphore bit data is returned from the local memory in the VXI instrument 234 to the target test and set device, i.e., the expansion/MXI card 108. The target test and set device in the card 108 then writes the set data in the 32-bit set data register discussed above into the respective semaphore bit in the VXI instrument 234. The test and set logic 220 preferably always writes the set data to the semaphore bit, because, if no other process or thread already has control, the respective process or thread desires to write the set data to indicate that it has ownership and control. If another process or thread already has control of the semaphore bit, then writing the set data to the semaphore bit merely overwrites the set data that is already there.

When the read/write operation completes in step 460, then in step 462 the target test and set device returns the read data and an acknowledge back to the thread executing on the CPU 202. During steps 452–462, the thread executing on the CPU 202 is waiting for the acknowledge and read data for the read cycle it generated in step 408 (FIG. 6). Thus, the read cycle is pending on the AT expansion bus 210 and the bus 210 and cannot be used by other processes or threads. In effect, the AT expansion bus 210 is locked while the test and set logic 220 in the expansion/MXI card 108 performs the desired test and set operation. Thus, the present invention allows a bus, such as the AT expansion bus 210, which does not inherently support locked test and set cycles or locked read-modify-write cycles, to be locked during a test and set operation. Once the read data and a read acknowledge has been returned to the CPU in step 462, then in step 464 the target test and set device clears the test and set prearm bit and operation of the test and set logic 220 completes.

Referring again to FIG. 6, in step 412 the thread receives the read data and acknowledge from the target test and set device. In step 414 the thread determines if the semaphore bit was already set prior to the test and set operation performed by the target test and set device. If the semaphore bit was already set prior to the test and set operation performed in step 410 by the target device, then in step 416 the thread executing on the CPU 202 retries the test and set operation at a later time, if desired. If the semaphore bit indicates that no thread had ownership of the respective address space in step 414, then the respective thread has acquired ownership of the address space by the test and set operation performed by the target device in step 410, and operation then completes.

Therefore, the present invention allows a process or thread to perform a locked test and set operation on a semaphore bit in memory, wherein the process and the memory storing the semaphore bit are separated by one or more buses which do not support locked read-modify-write cycles.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for performing test and set operations in a system comprising one or more first buses which do not include locked test and set capabilities, one or more second buses coupled to said one or more first buses which support locked test and set capabilities, a test and set device coupled between the one or more first buses and the one or more second buses, a CPU coupled to one of said one or more first buses, and a memory coupled to one of said one or more second buses, wherein the memory stores one or more bits, the method comprising:

the CPU writing a value to said test and set device indicating a test and set operation is desired;

the CPU generating a read operation of the one or more bits in the memory, wherein said generating the read operation includes generating a read cycle on the one or more first buses;

the test and set device performing a locked test and set operation to the one or more bits in the memory after said generating a read operation, wherein said performing a locked test and set operation comprises:

the test and set device receiving data from the one or more bits in the memory in response to the read operation; and the test and set device writing a predetermined set value to the one or more bits in the memory; and the test and set device returning said received data to the CPU to complete said read operation generated by the CPU;

wherein said read cycle is pending on said one or more first buses after said generating a read operation and prior to said returning said received data;

wherein said one or more first buses cannot be used while said read cycle is pending.

2. The method of claim 1, wherein said one or more bits in the memory are semaphore bits indicating ownership of an address space in the memory, the method further comprising:

the CPU examining said received data to determine if a process executing on the CPU had control of said address space during said step of writing a value.

3. The method of claim 1, wherein said step of the test and set device performing a locked test and set operation further comprises:

the test and set device determining if the CPU has indicated a test and set operation is desired prior to said step of the test and set device writing said predetermined set value to the one or more bits in the memory.

4. The method of claim 3, wherein said test and set device does not perform said step of writing said predetermined set value to the one or more bits in the memory if the test and set device determines that the CPU has not indicated that a test and set operation is desired in said step of determining.

5. The method of claim 1, wherein said test and set device includes a register storing a test and set prearm bit; and wherein said step of writing a value to said test and set device indicating a test and set operation is desired includes setting a bit in said test and set prearm bit register to indicate a test and set operation is desired;

wherein said step of the test and set device performing a locked test and set operation further comprises examining said test and set prearm bit register to determine if a test and set operation is desired prior to said step of writing said predetermined set value to the one or more bits in the memory.

6. The method of claim 5, further comprising the test and set device clearing said test and set prearm bit in said test and set prearm bit register after said step of returning said received data to the CPU to complete said read operation.

7. The method of claim 1, further comprising:

determining if a test and set operation is desired by another process after said step of writing a value to said test and set device indicating a test and set operation is desired;

transferring control to another process if a test and set operation is desired by another process.

8. The method of claim 1, wherein the test and set device performs the locked test and set operation to the one or more bits in the memory using said one or more second buses, wherein the one or more second buses support locked test and set capabilities.

9. A system which performs locked test and set operations on a memory, comprising:

one or more first buses which do not include locked test and set capabilities;

one or more second buses coupled to said one or more first buses which support locked test and set operations;

a test and set device coupled to at least one of the one or more second buses;

a CPU coupled to one of said one or more first buses which executes one or more processes; and a memory coupled to one of said one or more second buses which includes one or more bits, wherein said one or more processes executing on said CPU occasionally desires to perform test and set operations on said one or more bits in said memory;

wherein said CPU includes:

means for writing a value to said test and set device indicating a test and set operation is desired; and means for generating a read operation of said one or more bits in the memory;

wherein said test and set device includes:

means for performing a locked test and set operation to said one or more bits in the memory in response to said means for writing and means for generating a read operation; and means for returning data obtained from said one or more bits in the memory to the CPU.

10. The system of claim 9, wherein a read cycle is pending on said one or more first buses after said read operation is generated and prior to said received data being returned;

wherein said one or more first buses cannot be used while said read cycle is pending.

11. The system of claim 9, wherein said one or more bits in the memory are semaphore bits indicating ownership of an address space in the memory;

wherein said CPU includes means for examining said received data to determine if a process executing on the CPU already had control of said address space.

12. The system of claim 9, wherein said means for performing a locked test and set operation is operable to write a predetermined set value to the one or more bits in the memory, wherein said test and set device determines if the CPU has indicated a test and set operation is desired prior to writing said predetermined set value to the one or more bits in the memory.

13. The system of claim 12, wherein said test and set device does not write said predetermined set value to the one or more bits in the memory if the test and set device determines that the CPU has not indicated that a test and set operation is desired.

14. The system of claim 9, wherein said test and set device includes a register storing a test and set prearm bit; and wherein said means for writing a value to said test and set device indicating a test and set operation is desired sets a bit in said test and set prearm bit register to indicate a test and set operation is desired;

wherein said means for performing a locked test and set operation examines said test and set prearm bit register to determine if a test and set operation is desired.

15. The system of claim 14, wherein the test and set device clears said test and set prearm bit in said test and set prearm bit register after returning said received data to the CPU to complete said read operation.

16. The system of claim 9, wherein said CPU further comprises:

means for determining if a test and set operation is desired by another process after writing a value to said test and set device indicating a test and set operation is desired; and means for transferring control to another process if a test and set operation is desired by another process.

17. The system of claim 9, wherein said one or more first buses include an AT bus.

18. The system of claim 9, wherein said one or more second buses include a VXI bus.

19. A system which performs locked test and set operations on a memory, comprising:

one or more first buses which do not include locked test and set capabilities;

one or more second buses coupled to said one or more first buses which support locked test and set operations;

a test and set device coupled to at least one of the one or more second buses and at least one of the one or more first buses;

a CPU coupled to one of said one or more first buses which executes one or more processes; and a memory coupled to one of said one or more second buses which includes one or more bits, wherein said one or more processes executing on said CPU occasionally desires to perform test and set operations on said one or more bits in said memory;

wherein said CPU is operable to write a value to said test and set device indicating a test and set operation is desired, and wherein said CPU is operable to generate a read operation of said one or more bits in the memory, wherein the CPU generates the read operation on the one or more first buses;

wherein said test and set device is operable to perform a locked test and set operation to said one or more bits in the memory in response to the CPU writing a value to said test and set device and the CPU generating the read operation; and wherein said test and set device is operable to return data obtained from said one or more bits in the memory to the CPU.

20. The system of claim 14, wherein a read cycle is pending on said one or more first buses after said read operation is generated and prior to said received data being returned;

wherein said one or more first buses cannot be used while said read cycle is pending.

21. The system of claim 14, wherein said one or more bits in the memory are semaphore bits indicating ownership of an address space in the memory;

wherein said CPU is operable to examine said received data to determine if a process executing on the CPU already had control of said address space.

22. The system of claim 14, wherein said test and set device includes a direct memory access controller.

* * * * *

UNITED STATES PATENT AND TRADEMARK OFFICE
CERTIFICATE OF CORRECTION

PATENT NO. : 5,664,092
DATED : September 2, 1997
INVENTOR(S) : Nigel Waites

It is certified that error appears in the above-identified patent and that said Letters Patent is hereby corrected as shown below:

Claim 20, col. 12, line 7, please delete "claim 14" and substitute "claim 19".

Claim 21, col. 12, line 13, please delete "claim 14" and substitute "claim 19".

Claim 22, col. 12, line 19, please delete "claim 14" and substitute "claim 19".

Signed and Sealed this

Twenty-fifth Day of November, 1997

Attest:

BRUCE LEHMAN

Attesting Officer

Commissioner of Patents and Trademarks